April 28, 1942.   H. S. MALING   2,281,164
DEVICE FOR REMOVING BROKEN STUDS
Filed Feb. 19, 1941

INVENTOR.
Howard S. Maling
BY G. Ward Kamp

Patented Apr. 28, 1942

2,281,164

UNITED STATES PATENT OFFICE 2,281,164

DEVICE FOR REMOVING BROKEN STUDS

Howard S. Maling, Seattle, Wash.

Application February 19, 1941, Serial No. 379,627

1 Claim. (Cl. 81—53)

This invention relates to devices for removing parts of threaded studs, which have been broken off in threaded sockets at positions beneath the mouth of the sockets.

In mechanical combinations of metal bodies, it is common to provide threaded sockets in one member into which studs are threaded partially, leaving an outer end protruding by which another member is attached. In operation, and often in attempted removals, the studs are twisted or broken off beneath the mouth of the socket, and great difficulty has been met in attempts to remove the remaining lower end of the studs. In some cases holes been drilled into the stud and a squared tool driven in the hole and attempts thereby made to withdraw the stud, but this is often unsuccessful and at other times the threads in the socket are damaged.

It is therefore an object of this invention to provide a simple and easily constructed, and operated, device for readily removing such embedded parts of studs without damage to threads in the sockets. A particular object, is to provide such a device, comprising a hardened metal sleeve or tube with an outside thread thereon of suitable size and form to operate in the threads of the socket, whereby the tube may be screwed down upon the remaining part of the plug. A further object is to provide an internal thread on the inner wall of the tube in opposite direction or slope than the threads in the socket and on the stud, and to provide a mandrel or shaft with thread thereon to mesh inside the sleeve, whereby the shaft may be screwed down against the top of the stud, and pressure applied whereby the portion of stud may be revolved and drawn out from the socket simultaneously with the sleeve and shaft or mandrel.

With these and other objects to be hereinafter shown, I have illustratively exemplified my invention by the accompanying drawing of which:

Figure 2:
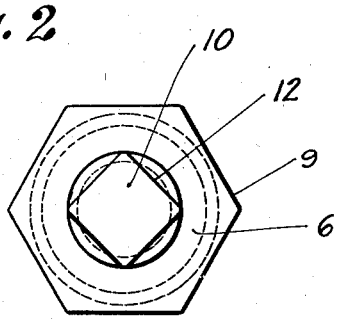
Figure 2 is a plan view of the parts assembled.
Figure 4:
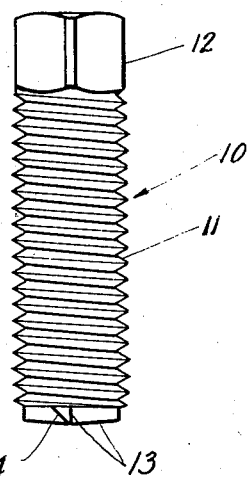
Figure 4 is an elevation of the shaft or mandrel with threads thereon.
Figure 1:
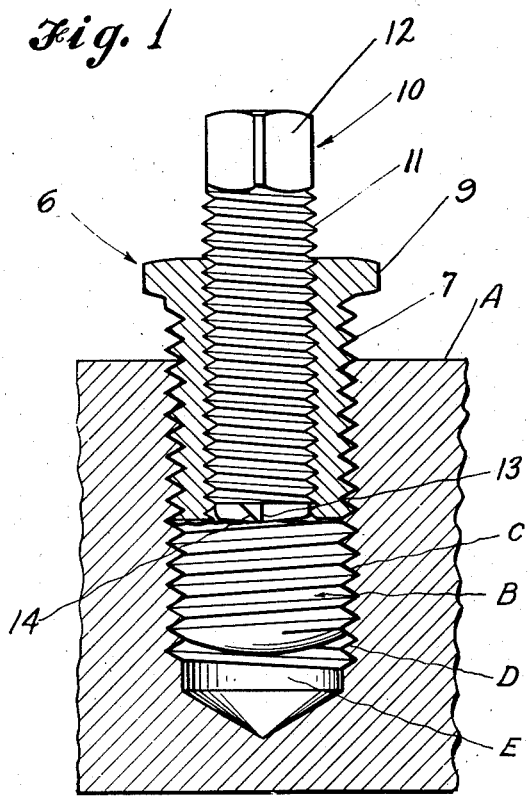
Figure 1 is a cross section view of my device with a portion of an embedded stud, and frame adjoining.
Figure 5:
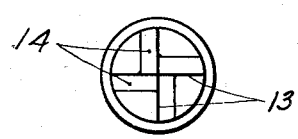
Figure 5 is a view of the lower end of the shaft, with ribs or teeth for contacting and twisting the stud outward.
Figure 3:
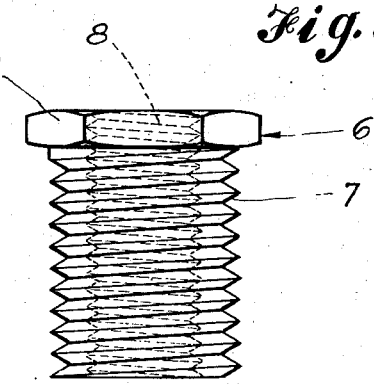
Figure 3 is an elevation view of the sleeve or threaded tube.

Like numerals and characters on the different figures represent like parts. A represents a metal block or frame of metal, to be provided with a stud, as B, with a thread C thereon, which is meshed with like thread D in the ordinary socket E. These threads are each shown as what is known as right handed threads, and most commonly used in threaded appliances.

A sleeve or hardened metal tube 6, is provided with a right handed thread 7 on the outside thereof for operative use and action with the threads in the socket, and a flange is provided around the top of the tube preferably hexagon in outer form, 9, for application of any suitable wrench for turning the sleeve and forcing the lower end thereof down upon the top of the broken portion of the stud.

The inner walls of the sleeve are provided with an internal thread 8, but sloping or turned in opposite direction from the outside thread, and being what is known as a left handed thread, and in this case of less pitch and having a greater number of threads per inch than the other thread, for greater strength or power.

A shaft, or mandrel 10, is provided with an outside thread 11, also turning to left side to mesh in the inner thread of the tube, and the top of the shaft is preferably squared or provided with means 12 for application of wrench for turning the shaft down through the tube and against the top of the section of stud. On the tip or lower end face of the shaft, are preferably provided teeth or ribs 13, of any desired form, for biting against and into the top of the stud, for twisting the same toward the left, or outward, when the shaft is turned.

From the foregoing description, it will be readily understood, that when the shaft is turned in its left handed threading upon the top of the stud, and the stud being meshed with a right handed thread, that the torsion from the shaft will turn the stud also to the left and outward on its right handed threads. The tube is simultaneously drawn upward by its right handed threads and pressure from the stud, and is or may be regulated in its outward travel by application of governing instrument or wrench on the flange at its top. After the stud has been raised to, or near the top of the socket, and having been loosened from its old bed, it may be easily removed.

The device and parts may be made of sizes to fit standard sockets or tapped holes for studs, and may be easily applied and used in positions where drills or means for operating a drill could not be applied.

In event the sockets and studs should be provided with left handed threads, then the outside thread on the tube would be a left handed one, and the threads inside the tube and outside the shaft would be right handed ones.

While I have described my invention by a certain drawing and language, yet I do not limit the invention to such specific descriptions, but desire to cover the same broadly by a claim.

Having described my invention, I claim as new:

A device for loosening and removing parts of broken studs from threaded sockets, comprising a tubular sleeve, a spiral thread on the outside of the sleeve to conform with the thread in the sockets, a spiral thread on the inner walls of the sleeve sloping in opposite direction from the outside thread thereon, and a shoulder on the top of the sleeve to facilitate turning the same within the sockets, a round bodied shaft and a spiral thread around the same operative with the said threads inside the sleeve, teeth projected from the lower end of the shaft to impinge against the top of the studs and adapted to turn said studs outward when the shaft is turned downward.

HOWARD S. MALING.